US008180120B2

(12) United States Patent
Hook

(10) Patent No.: US 8,180,120 B2
(45) Date of Patent: May 15, 2012

(54) FINGER SENSOR USING POLARIZED LIGHT AND ASSOCIATED METHODS

(75) Inventor: Jaroslav Hook, Melbourne, FL (US)

(73) Assignee: Authentec, Inc., Melbourne, FL (US)

( * ) Notice: Subject to any disclaimer, the term of this patent is extended or adjusted under 35 U.S.C. 154(b) by 1104 days.

(21) Appl. No.: 12/044,317

(22) Filed: Mar. 7, 2008

(65) Prior Publication Data

US 2008/0219522 A1 Sep. 11, 2008

Related U.S. Application Data

(60) Provisional application No. 60/894,074, filed on Mar. 9, 2007.

(51) Int. Cl.
*G06K 9/00* (2006.01)

(52) U.S. Cl. ........ 382/124; 382/125; 382/126; 382/128; 382/116; 382/134; 382/181; 382/190; 382/218; 382/276

(58) Field of Classification Search ............ 382/124, 382/125, 174, 165, 211, 260, 126, 128, 116, 382/134, 181, 190, 218, 276
See application file for complete search history.

(56) References Cited

U.S. PATENT DOCUMENTS

| | | | |
|---|---|---|---|
| 5,077,803 A * | 12/1991 | Kato et al. ............. | 382/124 |
| 5,351,303 A | 9/1994 | Willmore ................ | 382/2 |
| 5,689,576 A | 11/1997 | Schneider et al. ........ | 382/124 |
| 5,737,439 A | 4/1998 | Lapsley et al. .......... | 382/115 |
| 5,953,441 A | 9/1999 | Setlak ................... | 382/124 |
| 6,327,376 B1 | 12/2001 | Harkin .................. | 382/124 |
| 6,483,929 B1 | 11/2002 | Murakami et al. ........ | 382/115 |
| 6,560,352 B2 | 5/2003 | Rowe et al. ............ | 382/115 |
| 6,628,809 B1 | 9/2003 | Rowe et al. ............ | 382/115 |
| 6,816,605 B2 | 11/2004 | Rowe et al. ............ | 382/115 |
| 6,853,444 B2 * | 2/2005 | Haddad ................. | 356/71 |
| 7,147,153 B2 | 12/2006 | Rowe et al. ............ | 235/382 |
| 7,203,345 B2 | 4/2007 | Rowe et al. ............ | 382/115 |
| 7,263,213 B2 | 8/2007 | Rowe .................... | 382/124 |
| 7,361,919 B2 | 4/2008 | Setlak ................... | 250/556 |
| 7,460,696 B2 * | 12/2008 | Rowe .................... | 382/124 |
| 2002/0138768 A1 | 9/2002 | Murakami et al. ........ | 713/186 |
| 2003/0128867 A1 | 7/2003 | Bennett .................. | 340/5 |
| 2005/0089203 A1 * | 4/2005 | Setlak ................... | 382/124 |
| 2007/0280514 A1 * | 12/2007 | Heidt ................... | 382/124 |
| 2008/0025580 A1 * | 1/2008 | Sidlauskas et al. ...... | 382/124 |

OTHER PUBLICATIONS

Pircher et al., "Three dimensional polarization sensitive OCT of human skin in vivo", Optics Express, vol. 12, No. 14, 2004, Optical Society of America, pp. 3236-3244.
Lin et al., "Optical non-invasive latent fingerprint lifting", Frontiers in Optics 2005 OSA Annual Meeting, Laser Science XXI, Oct. 16-20, 2005.

(Continued)

*Primary Examiner* — Mike Rahmjoo
(74) *Attorney, Agent, or Firm* — Allen, Dyer, Doppelt, Milbrath & Gilchrist, P.A. Attorneys at Law

(57) ABSTRACT

A multi-biometric finger sensor may include an integrated circuit (IC) substrate for receiving a user's finger. The multi-biometric finger sensor may also include an optical source for projecting light of a known polarization angle onto the user's finger and at least one optical sensing pixel on the IC substrate for detecting a relative depolarization angle of the light reflected from the user's finger. The multi-biometric finger sensor may also include at least one other biometric finger sensing pixel on the IC substrate for sensing at least one other biometric characteristic from the user's finger.

29 Claims, 14 Drawing Sheets

OTHER PUBLICATIONS

Kalayjian et al., "A polarization contrast retina that uses patterned iodine-doped PVA film", Johns Hopkins University, Baltimore, MD, 1996.

Guo et al., Fabrication of thin-film micropolarizer arrays for visible imaging polarimetry, 2000 Optical Society of America, Applied Optics, vol. 39, No. 10, 04/41/2000, pp. 1486-1492.

Hermina et al., "Measuring polarized light through a scattering media", National Science Foundation, Aug. 6, 2003, Center for sub-surface sensing and imaging systems (CenSSIS), pp. 1-18.

Igarashi et al., "The appearance of human skin", Tech Report CUCS-024-05, Dept of Computer Science, Columbia University, NY, Jun. 2005, pp. 1-88.

DeBoer et al., "Polarization effects in optical coherence tomography of various biological tissues", 1999 IEEE Journal of Selected Topics in Quantum Electronics, vol. 5, No. 4, Jul./Aug. 1999, pp. 1200-1204.

Wang et al., "Propagation of polarized light in birefringent turbid media: time-resolved simulations", Optics Express, vol. 9, No. 5, Aug. 27, 2001, pp. 254-259.

Morgan et al., "Polarization properties of light backscattered from a two layer scattering medium", Optics Express, vol. 7, No. 12, Dec. 4, 2000, pp. 395-402.

Jacques et al., "Imaging skin pathology with polarized light", Journal of Biomedical Optics, Jul. 2002, vol. 7, No. 3, pp. 329-340.

Jiao et al., "Fiber-based polarization-sensitive Mueller matrix optical coherence tomography with continuous source polarization modulation", Applied Optics, Sep. 10, 2005, vol. 44, No. 26, pp. 5463-5467.

* cited by examiner

| | | | | | |
|---|---|---|---|---|---|
| STRATUM CORNEUM | 400 | 2000 | | 230 | 0.9 |
| EPIDERMIS | 415 | 800 | | 66 | 0.74 |
| | 488 | 600 | | 50 | 0.76 |
| | 514 | 600 | | 44 | 0.77 |
| | 585 | 470 | | 36 | 0.79 |
| | 633 | 450 | | 35 | 0.8 |
| DERMIS | 415 | 320 | | 4.7 | 0.74 |
| | 488 | 250 | | 3.5 | 0.76 |
| | 514 | 250 | | 3 | 0.77 |
| | 585 | 196 | | 3 | 0.79 |
| | 633 | 187.5 | | 2.7 | 0.8 |
| | 633 | | 11.64 | <10 | 0.97 |
| | 633 | | 23.8 | 2.7 | |
| | 700 | | 21.3 | 1.9 | |
| DERMIS (LEG) | 635 | 244 | 78 | 1.8 | 0.68 |
| SKIN AND UNDERLYING TISSUES (LEG) | 633 | 70.7 | 11.4 | 3.1 | 0.8 |
| CAUCASIAN MALE SKIN | 500 | | 50 | 5.1 | |
| CAUCASIAN FEMALE SKIN | 500 | | 23.9 | 5.2 | |
| HISPANIC MALE SKIN | 500 | | 24.2 | 3.8 | |
| FOREARM:FAT | 500 | | 12 | 0.076 | |

FIG. 9
(PRIOR ART)

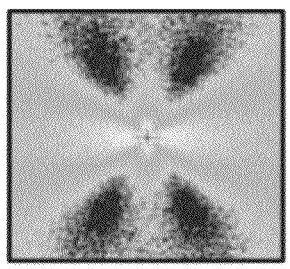
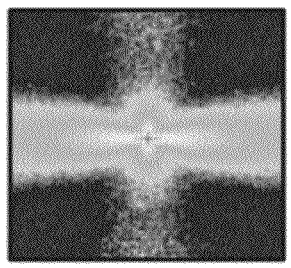
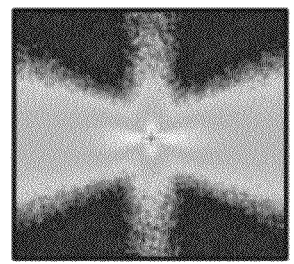
DOLP PATTERNS OF BACKSCATTERED LIGHT
FIG. 11A
(PRIOR ART)
FIG. 11B
(PRIOR ART)
FIG. 11C
(PRIOR ART)
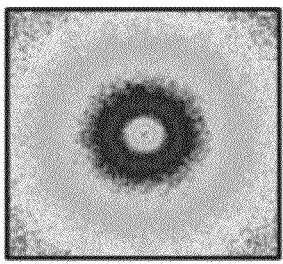
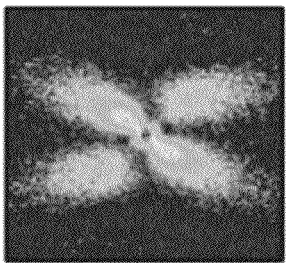
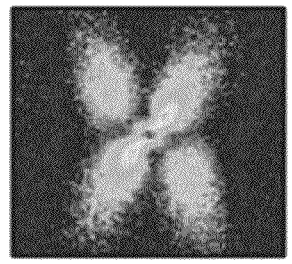
DOCP PATTERNS OF BACKSCATTERED LIGHT
FIG. 12A
(PRIOR ART)
FIG. 12B
(PRIOR ART)
FIG. 12C
(PRIOR ART)

G. BLACK TATTOO
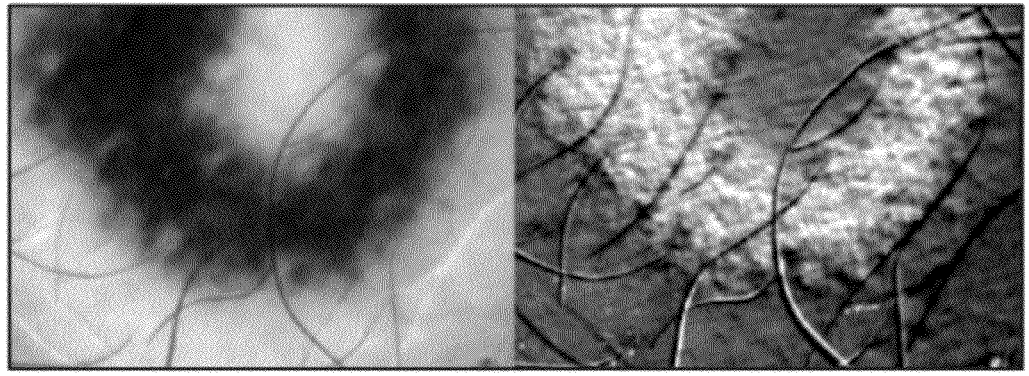
NORMAL IMAGE
FIG. 15A
(PRIOR ART)
POL IMAGE
FIG. 15B
(PRIOR ART)
H. NONPIGMENTED INTRADERMAL NEVUS
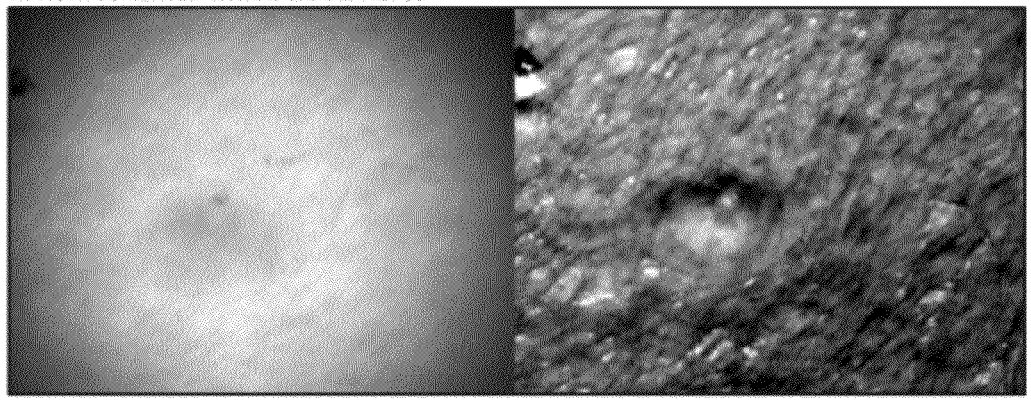
NORMAL IMAGE
FIG. 15C
(PRIOR ART)
POL IMAGE
FIG. 15D
(PRIOR ART)

COMPOUND NEVUS
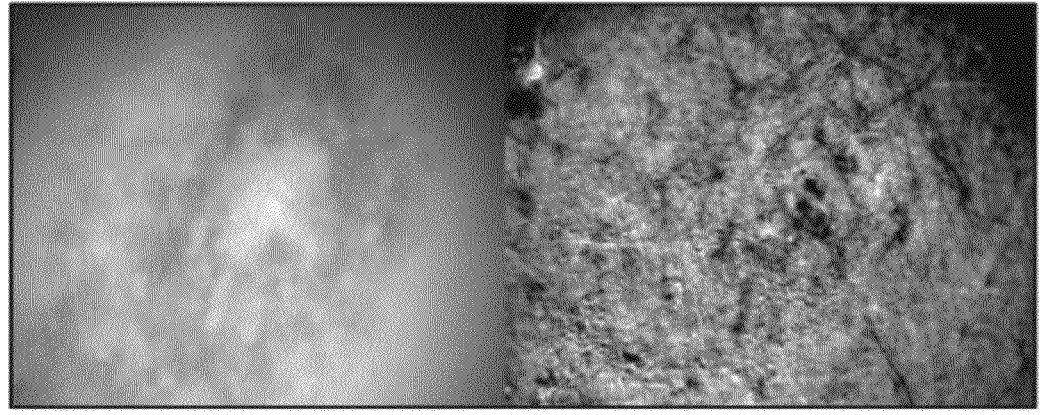
NORMAL IMAGE
FIG. 16A
(PRIOR ART)
POL IMAGE
FIG. 16B
(PRIOR ART)
COMPOUND NEVUS WITH ATYPICAL FEATURES
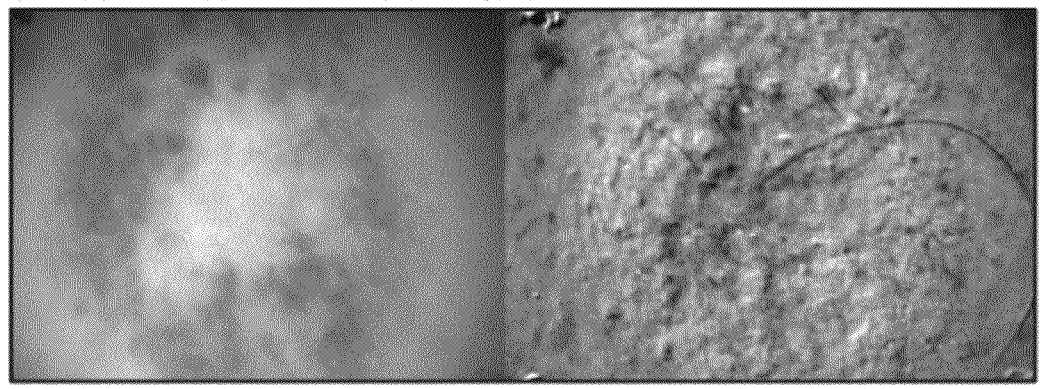
NORMAL IMAGE
FIG. 16C
(PRIOR ART)
POL IMAGE
FIG. 16D
(PRIOR ART)

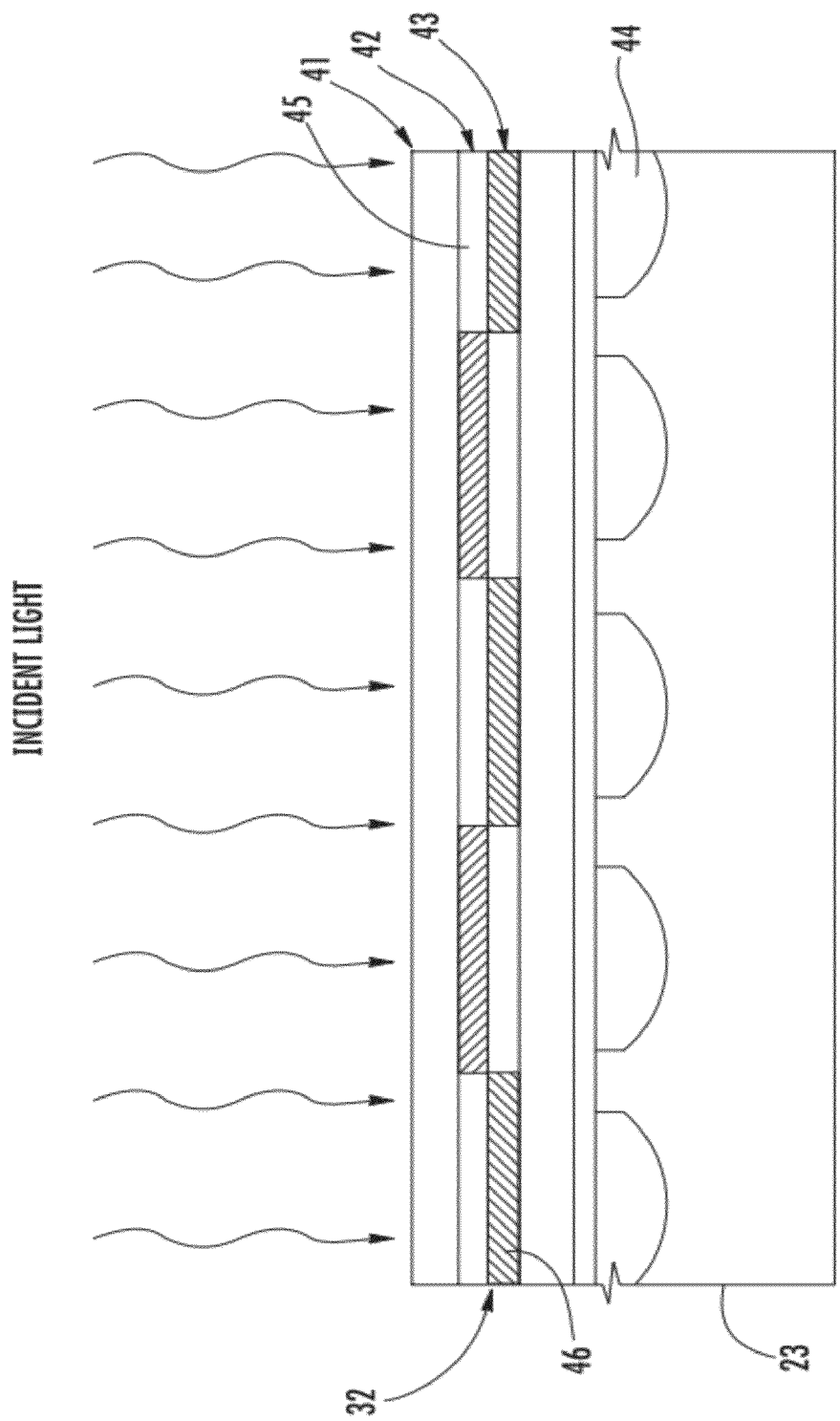

FINGER SENSOR USING POLARIZED LIGHT AND ASSOCIATED METHODS

RELATED APPLICATIONS

The present application is based on provisional application Ser. No. 60/894,074, filed Mar. 9, 2007, the entire contents of which are incorporated by reference.

FIELD OF THE INVENTION

The present invention relates to biometric sensing, and, more particularly to biometric sensing using integrated circuit optical sensors and associated methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention. The fingerprint sensor is an integrated circuit sensor that drives the user's finger with an electric field signal and senses the electric field with an array of electric field sensing pixels on the integrated circuit substrate. The Setlak patent also discloses an approach to reduce spoofing by sensing another biometric characteristic of the user's finger, in particular, the same electric field sensing pixels are used to determine a complex impedance of the object presented to the sensor. Spoof reduction circuitry determines if the complex impedance of the presented object is indicative of a live finger. In other words, the Setlak patent discloses a biometric authentication approach that relies on multiple biometrics of the user's finger.

Other multi-biometric approaches may use various combinations of voice recognition, facial recognition, fingerprint recognition, and signature dynamics, for example. To satisfy the system, a user must satisfy several of the selected biometrics independently. Such systems may show enhanced selectivity over single biometric systems because false matches in one biometric characteristic are uncorrelated to false matches to a second biometric characteristic. Such a multi-biometric system may be more difficult to spoof, because each of the biometrics needs to be spoofed to compromise the system as a whole.

Representative of multi-biometric systems is, for example, U.S. Patent Application Publication No. 2002/0138768 to Murakami et al. This reference discloses sensing a heartbeat waveform that is substantially, but not necessarily completely unique, as a first biometric trait or characteristic. A second biological trait is used in conjunction with the first biological trait that is preferably also a live physiological trait. Examples of live, potentially substantially unique biological traits include the depth of the various layers of epithelial tissue from a given point on an individual's skin surface. The density of a particular kind of connective tissue, such as bone density, may be another substantially unique histological trait. Likewise, the light absorption characteristics of skin tissue or the visual retinal patterns of an iris could be substantially unique traits. Along these lines, U.S. Patent Application Publication No. 2003/0128867 to Bennett and U.S. Pat. No. 6,483,929 to Murakami et al. both disclose a biometric system that injects infrared energy into the user's finger and senses resulting infrared energy from the user's finger, such as to obtain the user's heartbeat as a biometric.

U.S. Pat. No. 6,327,376 to Harkin discloses a multi-biometric sensor including capacitive sensing pixels below a glass transparent sensing surface for sensing the ridge pattern of the user's finger. The sensor may also include an additional sensor of the contactless kind which relies for its sensing on the use of light, such as visible or infrared light, that can be positioned behind the capacitive fingerprint sensing array.

U.S. Pat. No. 6,560,352 to Rowe et al. discloses a biometric analysis based on using near-ultraviolet, visible, very near-infrared, or near-infrared energy and combinations thereof. U.S. Pat. No. 5,351,303 to Willmore discloses a biometric system that senses and compares the infrared image pattern from an individual's finger to another infrared image pattern of the same finger stored within system memory. Other biometric sensing approaches are also disclosed using ultrasonic imaging, such as U.S. Pat. No. 5,689,576 to Schneider et al. and U.S. Pat. No. 5,737,439 to Lapsley et al., for example.

Unfortunately, the prior art multi-biometric systems may have certain drawbacks. Those having two different sensors are relatively complicated, and may be expensive to install and operate. Those that require multiple presentations of a user's body part, for example, may be inconvenient. The requirement for multiple steps also slows the process. Independent sensors may also be spoofed independently. Of course, there is a continuing need to also further develop even single biometric sensors and systems.

A particularly advantageous approach to multi-biometric fingerprint sensing is disclosed in U.S. Patent Application Publication No. 2005/0089203 to Setlak, which is assigned to the assignee of the present invention and is incorporated in its entirety by reference. The Setlak application discloses a multi-biometric finger sensor sensing different biometric characteristics of a user's finger that have different matching selectivities. The Setlak application also discloses the use of a plurality of biometric sensing pixels to detect a plurality of finger biometric characteristics. Nevertheless, further improvements are still desirable.

SUMMARY OF THE INVENTION

In view of the foregoing background, it is therefore an object of the present invention to provide an accurate, compact, and reliable biometric finger sensor and associated methods.

This and other objects, features and advantages in accordance with the present invention are provided by a multi-biometric finger sensor apparatus sensing different biometric characteristics. More particularly, the multi-biometric finger sensor apparatus may include an integrated circuit substrate for receiving the user's finger adjacent hereto. The multi-biometric finger sensor apparatus may also include an optical source for projecting light of a known polarization angle onto the user's finger.

Moreover, the multi-biometric finger sensor apparatus may further include at least one optical sensing pixel for receiving the reflected light from the user's finger. Advantageously, the at least one optical sensing pixel may have the capability of detecting the relative depolarization angle of the reflected light from the user's finger. The reflected light from the user's finger may have a corresponding depolarization angle for the depth of the user's finger at which the light was reflected.

The multi-biometric finger sensor apparatus may comprise at least one other biometric sensing pixel for sensing another biometric characteristic from the user's finger. The at least one other biometric sensor pixel may comprise an electric field, capacitive, thermal or other type of sensing pixel, for example.

The multi-biometric finger sensor apparatus further may include a processor coupled to the at least one optical sensing pixel and the at least one other biometric sensing pixel. The spoofing of the multi-biometric finger sensor apparatus according to the present invention may be made more difficult based upon the multi-biometric sensing.

The multi-biometric finger sensor apparatus may also include at least one polarization filter in an optical path between the optical source and the at least one optical sensing pixel. The at least one polarization filter may also include a respective polarizing filter associated with each optical source and at least one optical detector. The at least one polarization filter may include a material having at least one dichroic polarization property.

Indeed, in some advantageous embodiments, a first set of optical sensing pixels may have a polarizing filter associated therewith, and a second set of optical sensing pixels may not have such a filter. For example, the filter for the first set of pixels may be polarized ninety degrees relative to the optical source common to both pixel sets. By subtracting the output of the first set from the second set, one can extract the light that tends to come from the depth of the finger rather than from the surface because the light depolarizes more with depth.

The multi-biometric finger sensor apparatus may include an uppermost dielectric passivation layer over the at least one optical sensing pixel and the at least one other biometric sensing pixel, upon which the user's finger is positioned. In addition, the integrated circuit substrate may comprise silicon, or thin film substrate material, for example.

The IC substrate may include silicon, for example. Still further, the optical source may include an LED or laser diode, and the optical source may also produce at least one of circularly polarized light, elliptically polarized light, and linearly polarized light. Additionally, the at least one other biometric finger sensing pixel may include an electric field sensing pixel. Still further, the at least one other biometric finger sensing pixel may include a capacitive sensing pixel or a thermal sensing pixel, for example.

The at least one optical sensing pixel and the at least one other biometric sensing pixel may operate based upon the static placement of the user's finger adjacent the integrated circuit substrate. Alternatively, the at least one optical sensing pixel and the at least one other biometric sensing pixel may operate based upon the sliding placement of the user's finger adjacent the integrated circuit substrate.

In some embodiments, the polarization sensing feature may be used alone, or with two or more other biometric sensing pixels. A method aspect of the present invention is directed to a multi-biometric finger sensing method. The method may include receiving a user's finger adjacent an integrated circuit substrate, projecting light onto the user's finger, sensing a depolarization angle of reflected light from the user's finger by using at least one optical sensing pixel on the integrated circuit substrate, sensing another biometric of the user's finger by using at least one other biometric sensing pixel on the integrated circuit substrate, and spatially correlating the biometric characteristics of the user's finger at varying depths.

The method may further include polarizing the light before being projected onto the user's finger. Alternatively or additionally, the method may include polarizing the light reflected from the user's finger before sensing of the depolarization angle.

BRIEF DESCRIPTION OF THE DRAWINGS

FIG. 9 is a chart of the scattering and absorption parameters of skin over the spectrum of visible light as in the prior art.

FIGS. 11a-11c are graphs of the degree of linear polarization patterns of backscattered light in different turbid mediums as in the prior art.

FIGS. 12a-12c are graphs of the degree of linear polarization patterns of backscattered light, where the incident light is circularly polarized, in different turbid mediums as in the prior art.

FIGS. 15a-15d are images of a portion of the user's skin using unpolarized and polarized light as in the prior art.

FIGS. 16a-16d are images of another portion of the user's skin using unpolarized and polarized light as in the prior art.

FIG. 17 is a cross-sectional view of a portion of the integrated circuit substrate of the finger sensor apparatus of FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
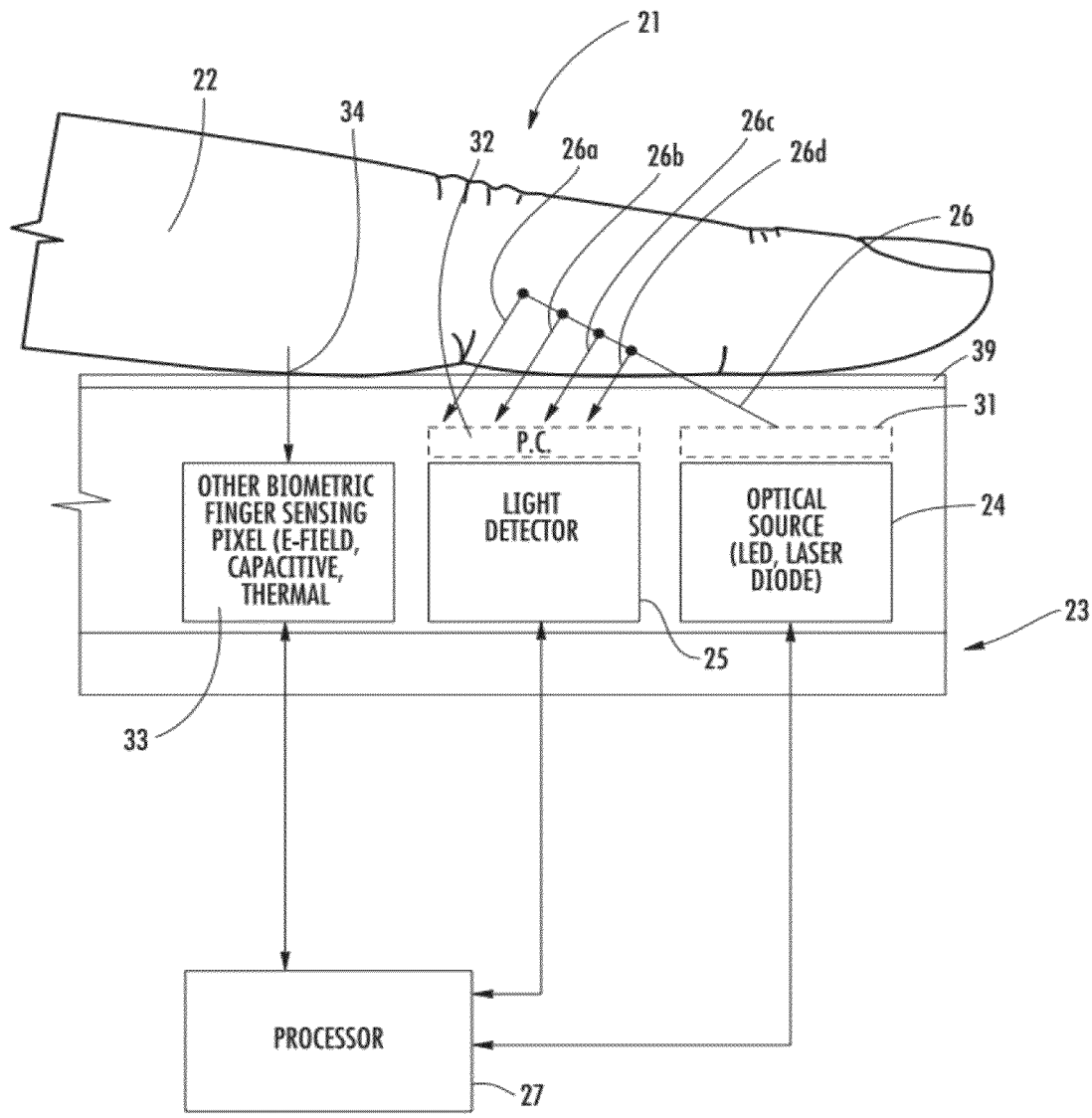
FIG. 1 is a schematic diagram of a multi-biometric finger sensor apparatus according to the present invention.
Figure 2:
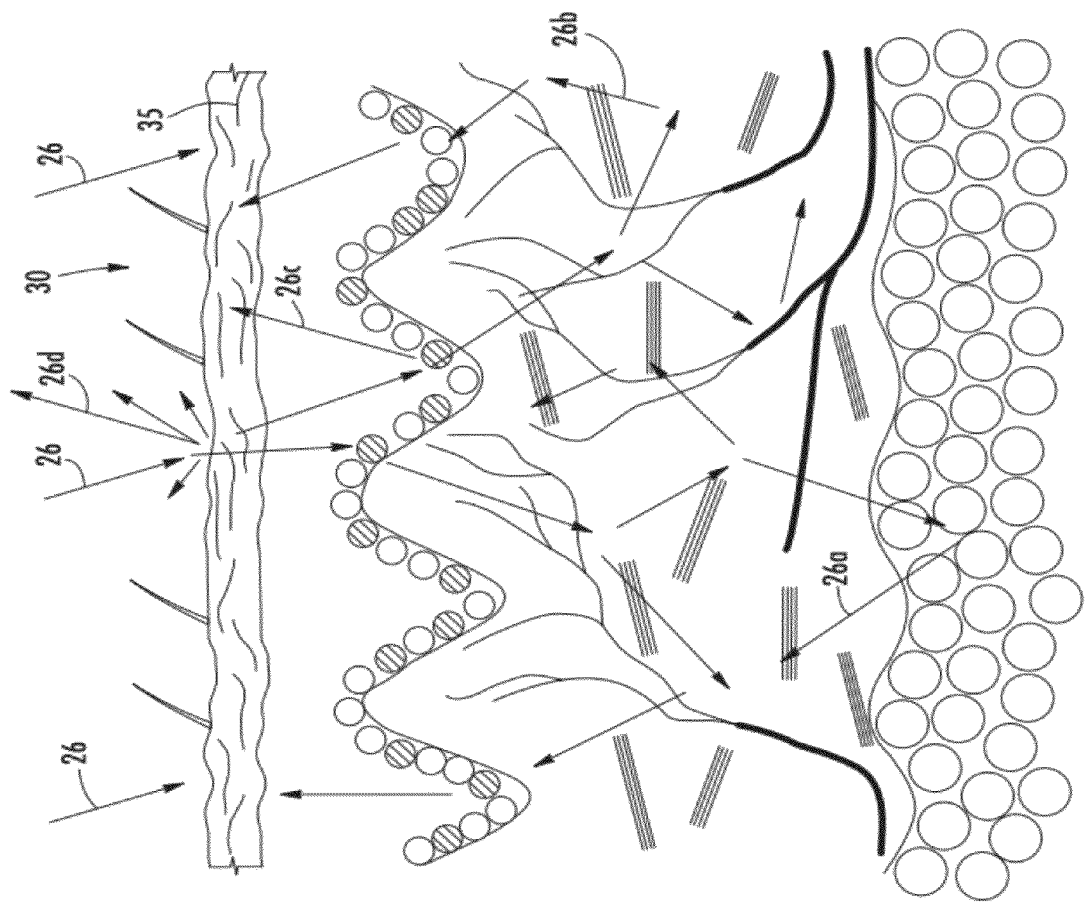
FIG. 2 is a schematic diagram of the human skin of a user's finger as on the sensor apparatus of FIG. 1, with projected polarized light penetrating the skin.

Referring initially to FIGS. 1-2, a multi-biometric finger sensor apparatus 21 sensing different biometric characteristics within a user's finger 22 in accordance with the present invention is now described. More particularly, the multi-biometric finger sensor apparatus 21 may include an integrated circuit substrate 23 for receiving the user's finger 22 adjacent hereto. The multi-biometric finger sensor apparatus 21 may also include an optical source 24 for projecting light 26 of a known polarization angle onto the user's finger 22. The optical source 24 may project any form of electromagnetic radiation onto the user's finger 22. As will be appreciated by one skilled in the art, the optical source 24 may project, for example, visible light, infrared radiation, etc. The optical source 24 may be an LED or laser diode, for example.

The multi-biometric finger sensor apparatus 21 may further include at least one optical sensing pixel 25 for detecting rays of reflected light 26a-d from the user's finger 22. Advantageously, the at least one optical sensing pixel 25 may have the capability of detecting the relative depolarization angle of each ray of reflected light 26a-d from the user's finger. Each ray of reflected light 26a-d may have a corresponding depolarization angle relating to the depth of the biometric feature within the user's finger 22 that the ray of reflected light was reflected from. The depolarization angle or each ray of reflected light 26a-d may be reduced when the projected light 26 is circularly polarized light versus linearly polarized light. Moreover, as will be appreciated by one skilled in the art, the depolarization angle or each ray of reflected light 26a-d may be altered based upon the frequency of the projected light 26. This depolarization property of the rays of reflected light 26a-d may be attributed to Mie and Raleigh scattering.

Figures 3A, 3B:
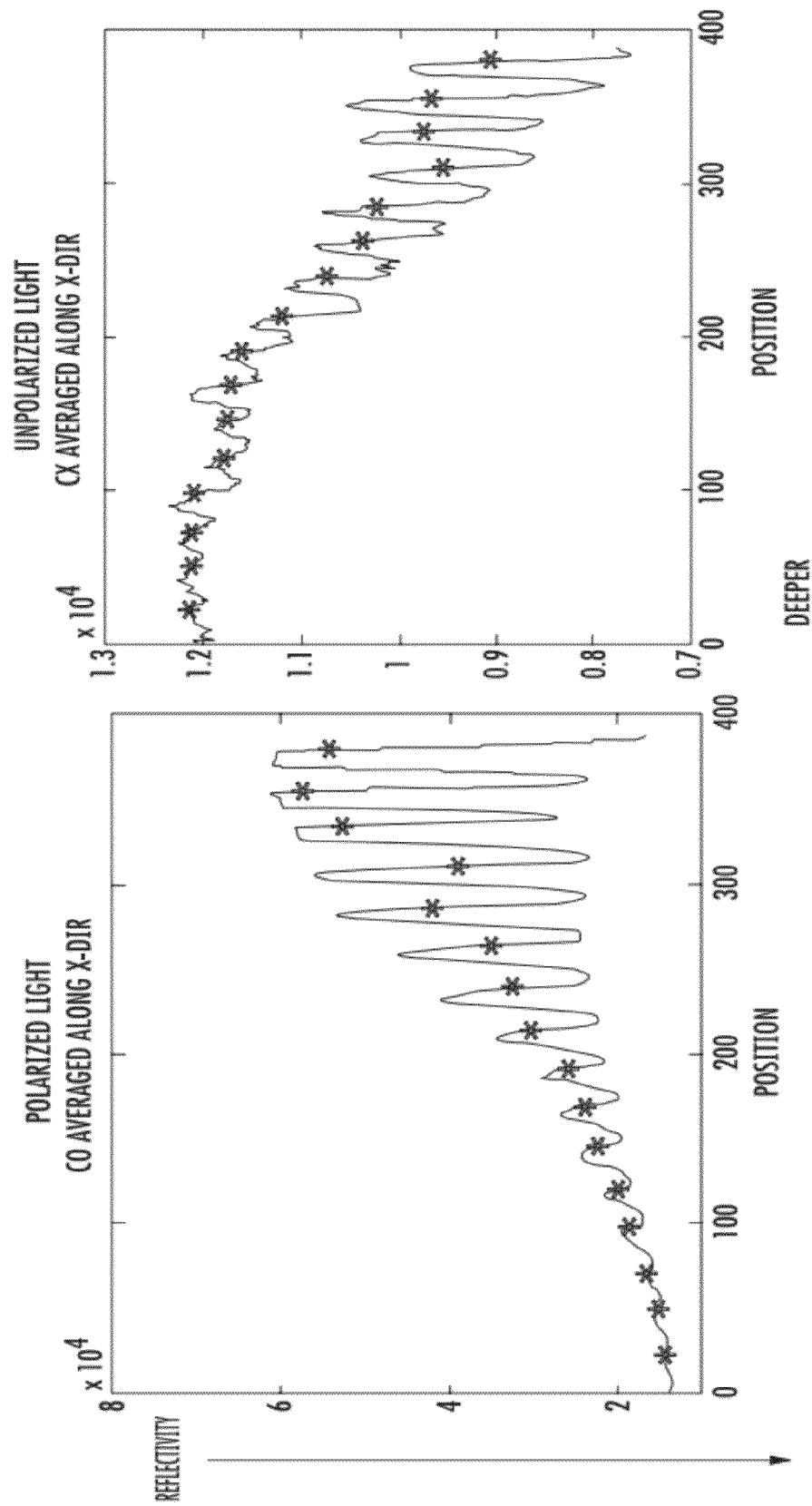
FIGS. 3a-3b are charts plotting the reflectivity characteristics of polarized and unpolarized light at different depths of the user's finger as in the prior art.
Figure 4:
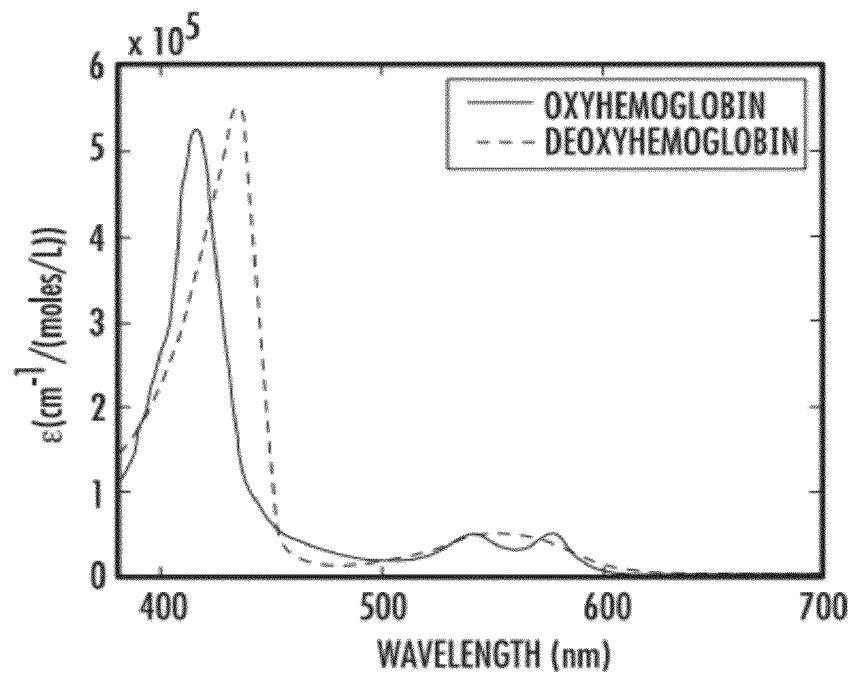
FIG. 4 is a chart of the spectral absorption pattern of oxy-hemoglobin and deoxy-hemoglobin as in the prior art.
Figure 5:
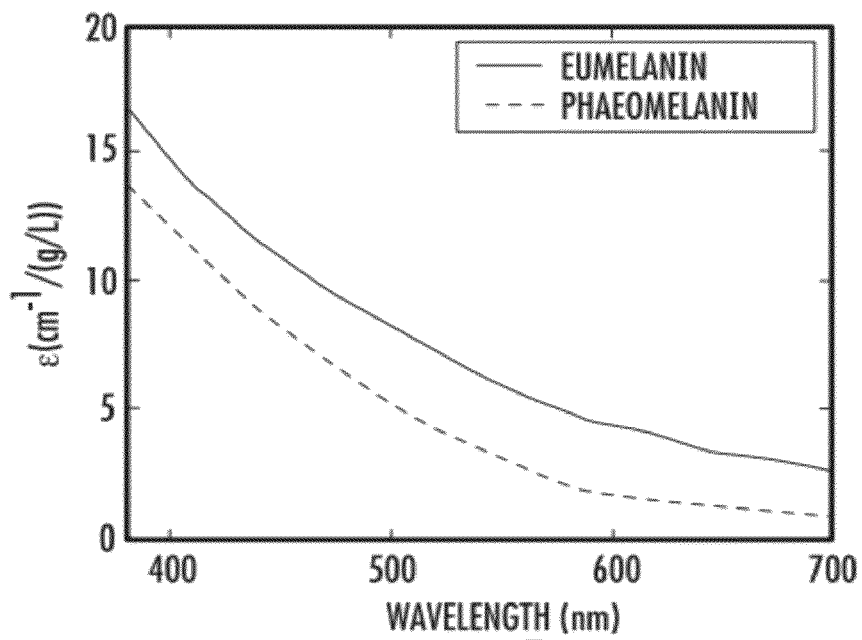
FIG. 5 is a chart of the spectral absorption pattern of eumelanin and phaeomelanin as in the prior art.
Figure 6:
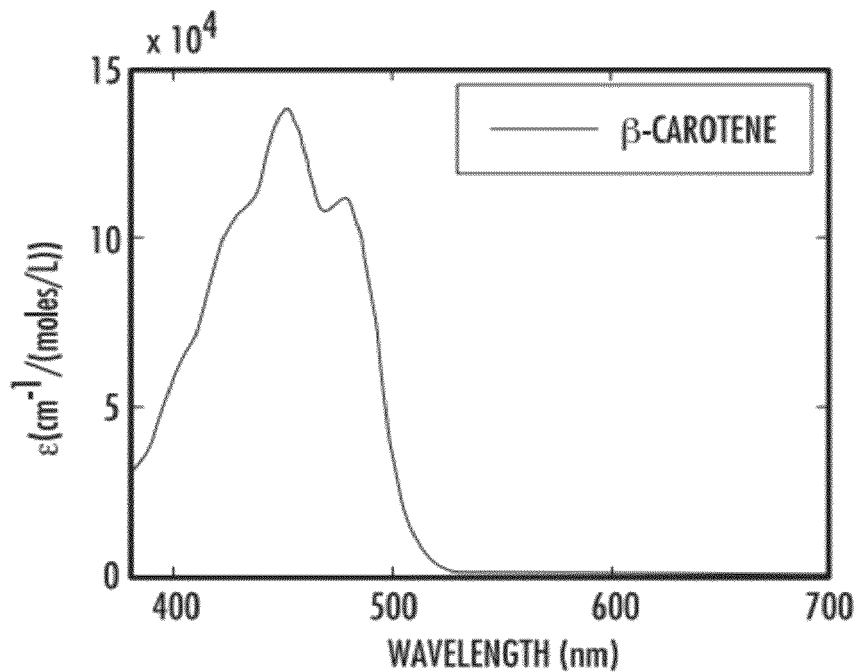
FIG. 6 is a chart of the spectral absorption pattern of β-carotene as in the prior art.
Figure 7:
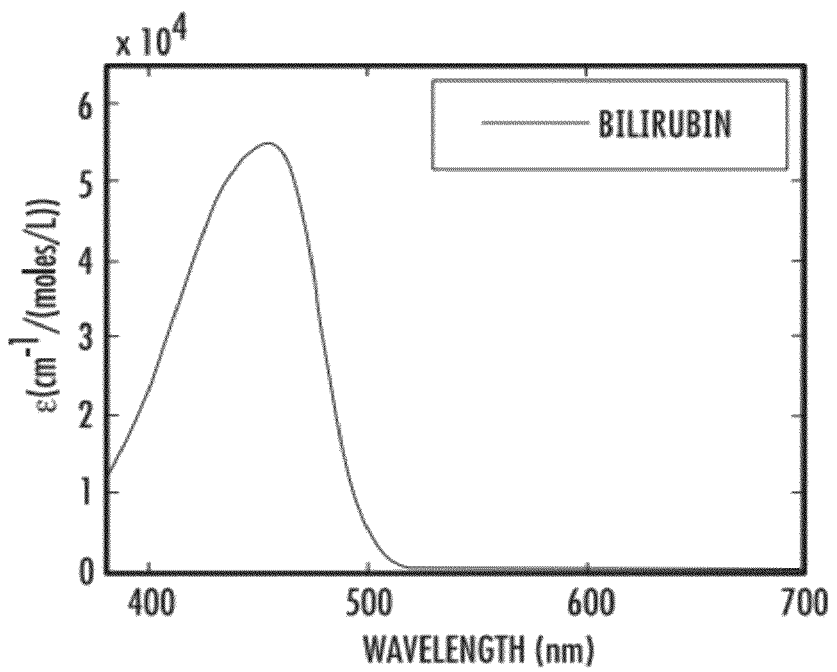
FIG. 7 is a chart of the spectral absorption pattern of bilirubin as in the prior art.
Figure 8:
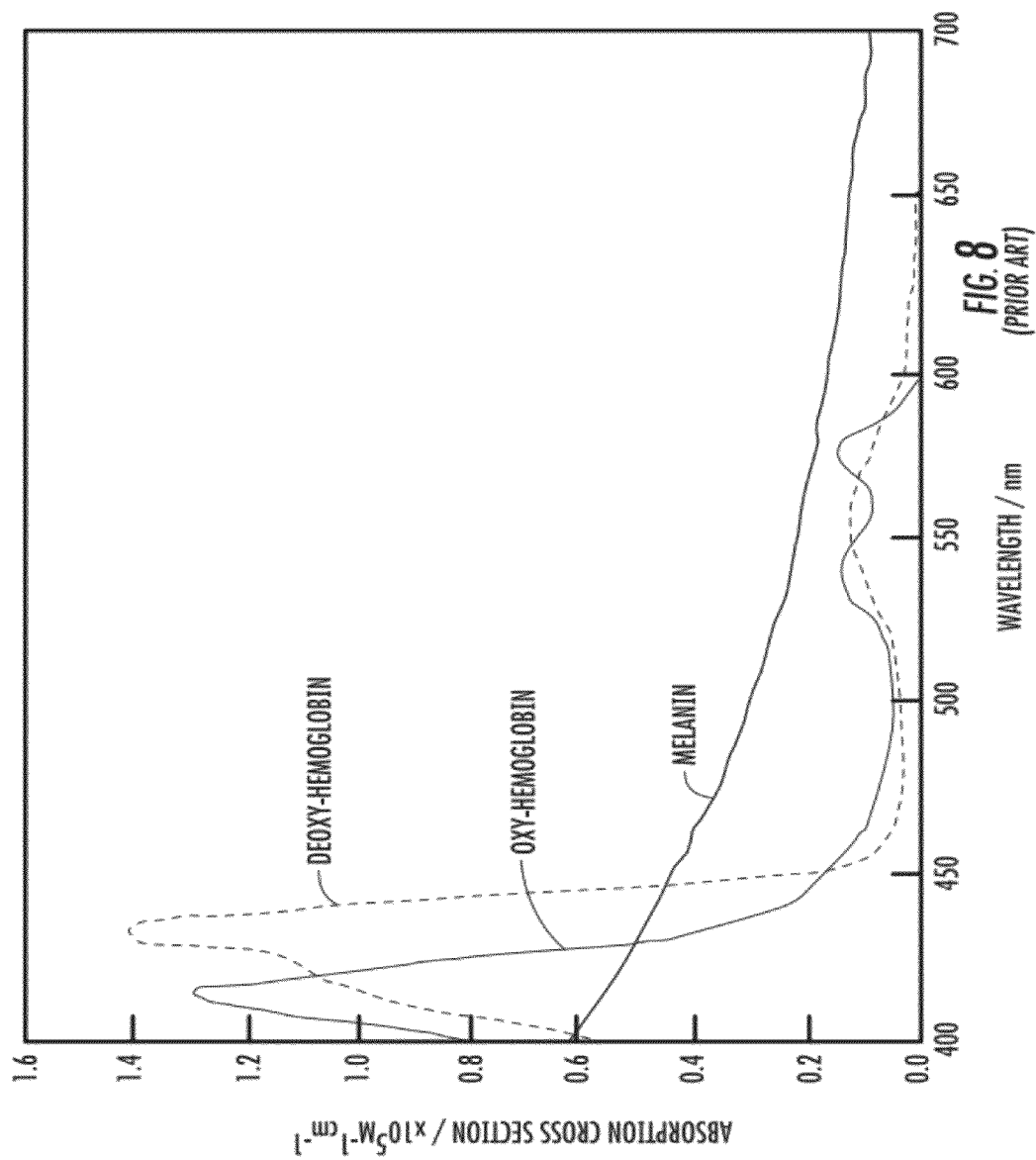
FIG. 8 is a chart of the spectral absorption pattern of deoxy-hemoglobin, oxy-hemoglobin, and melanin as in the prior art.

As the depth of the skin 30 increases, the effects of scattering may become more pronounced (FIG. 2). Furthermore, the scattering may reduce the intensity of the rays of reflected light 26a-d and may randomize the polarization of rays of reflected light. More particularly, the chance of depolarization of the rays of reflected light 26a-d may increase as the rays of reflected light are subjected to repeated scattering. Additionally, as illustrated in FIGS. 3a-b, at greater depths within the user's finger 22, the reflectivity of the projected light 26 that has been polarized may be greater than that of unpolarized light. Moreover, as illustrated in FIGS. 15a-d and 16a-d, the projected light 26, when polarized, may tend to extract surface features. See, "Imaging skin pathology with polarized light," Steven Jacques et. al., Journal of Biomedical Optics 7:329-340, 2002; and "Three dimensional polarization sensitive OCT of human skin in vivo," Michael Pircher et.al, Optics Express, Vol. 12, Issue 14, pp. 3236-3244, "Optical Non-Invasive Latent Fingerprint Lifting," Frontiers in Optics 2005 OSA Annual Meeting, Laser Science XXI, October 16-20, Tucson, Ariz., USA, the entire contents of these are incorporated by reference.

Advantageously, the at least one optical sensing pixel 25 may receive only the rays of reflected light 26a-d that are polarized. Thereby, the rays of reflected light 26a-d that traveled the most direct path and were subject to the least amount of scattering may be received by the at least one optical sensing pixel 25. Furthermore, the rays of reflected light 26a-d may be polarized; thereby, the rays may be more likely to be reflected by the biometric features of the user's finger 22 at greater depths versus unpolarized light. Therefore, the resolution of the multi-biometric finger sensor apparatus 21 may be advantageously increased.

The multi-biometric finger sensor apparatus 21 may also comprise at least one other biometric sensing pixel 33 for sensing another biometric characteristics from the user's finger 22. The at least one other biometric sensing pixel 33 may comprise an electric field, capacitive, thermal or other type of sensing pixel, for example. Any of the optical sensing pixels described in Published Application No. 2005/0089203 to Setlak et al. may be used for example.

The multi-biometric finger sensor apparatus 21 may further include a processor 27 coupled to the at least one optical sensing pixel 25 and the at least one other biometric sensing pixel 33. Thereby, the spoofing of the multi-biometric finger sensor apparatus 21 may be made more difficult since multiple biometrics of the user's finger 22 are sensed by the at least one optical sensing pixel 25 and the at least one other biometric sensing pixel 33.

The multi-biometric finger sensor apparatus 21 may also include a polarization filter 31 positioned over the optical source 24 for polarizing the optical source's output with a known polarization angle. As will be appreciated by one skilled in the art, the polarization filter 31 may comprise any material known to possess dichroic polarization properties. Alternatively or additionally, the multi-biometric finger sensor apparatus 21 may also include another polarization filter 32 disposed over the at least one optical sensing pixel 25 for polarizing the rays of reflected light 26a-d from the user's finger 22. As will appreciated by those skilled in the art, the polarization filter 31, 32 may be in an optical path between the optical source and the at least one optical sensing pixel.

Two polarization filters 32 may be used in the path of the reflected light 26a-d from the user's finger 22. More particularly, the reflected light 26a-d to respective optical sensing pixels 25 may be polarized by the two polarization filters 32 in an alternating perpendicular arrangement, for example. In this arrangement, since there are two orientations, at least two sensing pixels 25 are used. In other words, at least three polarizing filters are used, one 31 for the optical source 24, and one 32 for each optical sensing pixel 25. This advantageously allows the comparison of polarized versus unpolarized light, and thus provides information regarding the properties of the finger that are located deeper below the finger's 22 surface. Contrastingly, conventional sensors typically look at the finger's 22 surface properties only.

As illustrated in FIG. 17, the polarization filter 32 may be positioned on the integrated circuit substrate 23 by forming a polarized vinyl alcohol (PVA) film or contrast retina over the integrated circuit substrate in conjunction with a focal plane polarization imager, for example. The polarization filter 32 may include an acetate layer 41 and 0°-orientation PVA film layer 42 positioned below the acetate layer. A 90°-orientation PVA film layer 43 is positioned between the 0°-orientation PVA film layer 42 and above the photodiode diffusion layer 44 of the integrated circuit substrate 23. The 0°-orientation PVA film layer 42 and 90°-orientation PVA film layer 43 illustratively include alternating undoped and dichroic regions 45, 46. See "A Polarization Contrast Retina That Uses Patterned Iodine-Doped PVA film," Zaven Kalayjian et. al., Sensory Communication Lab, ECE department, Johns Hopkins University, Baltimore (1996), the entire contents of which are incorporated by reference. Alternatively or additionally, as disclosed in "Fabrication of thin-film micropolarizer arrays for visible imaging polarimetry," Junpeng Guo et al., Applied Optics, Vol. 39, Issue 10, pp. 1486-1492 (2000), the entire contents of which are incorporated by reference, a micropolarizer may also be used.

Referring again to FIGS. 1-2, the at least one optical sensing pixel 25 and the at least one other biometric sensing pixel 33 may operate based upon the static placement of the user's finger 22 adjacent the integrated circuit substrate 23. Alternatively, the at least one optical sensing pixel 25 and the at least one other biometric sensing pixel 33 may operate based upon the sliding placement of the user's finger 22 adjacent the integrated circuit substrate 23.

The multi-biometric finger sensor apparatus 21 may include an uppermost dielectric passivation layer 39 over the at least one optical sensing pixel 25 and the at least one other biometric sensing pixel 33, upon which the user's finger 22 is positioned. In addition, the integrated circuit substrate 23 may comprise silicon, or thin film substrate material, for example.

As will be appreciated by one skilled in the art, the projected light 26 may be circularly polarized light, elliptically polarized light, or linearly polarized light. See, "Measuring Polarized Light through a Scattering Media," Hermina et al., Center for Subsurface Sensing and Imaging Systems, North Eastern University (Aug. 6, 2003) pp. 1-18, the entire contents of which are incorporated by reference. Of course, the angle of polarization for linearly polarized light may also be controlled.

Figure 10:
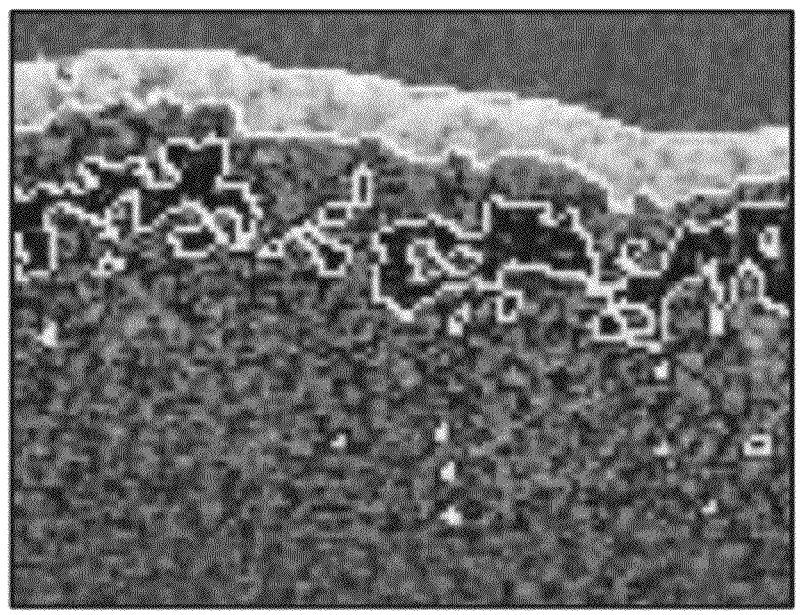
FIG. 10 is a cross-sectional view of the birefringent regions of the skin as in the prior art.
Figure 13:
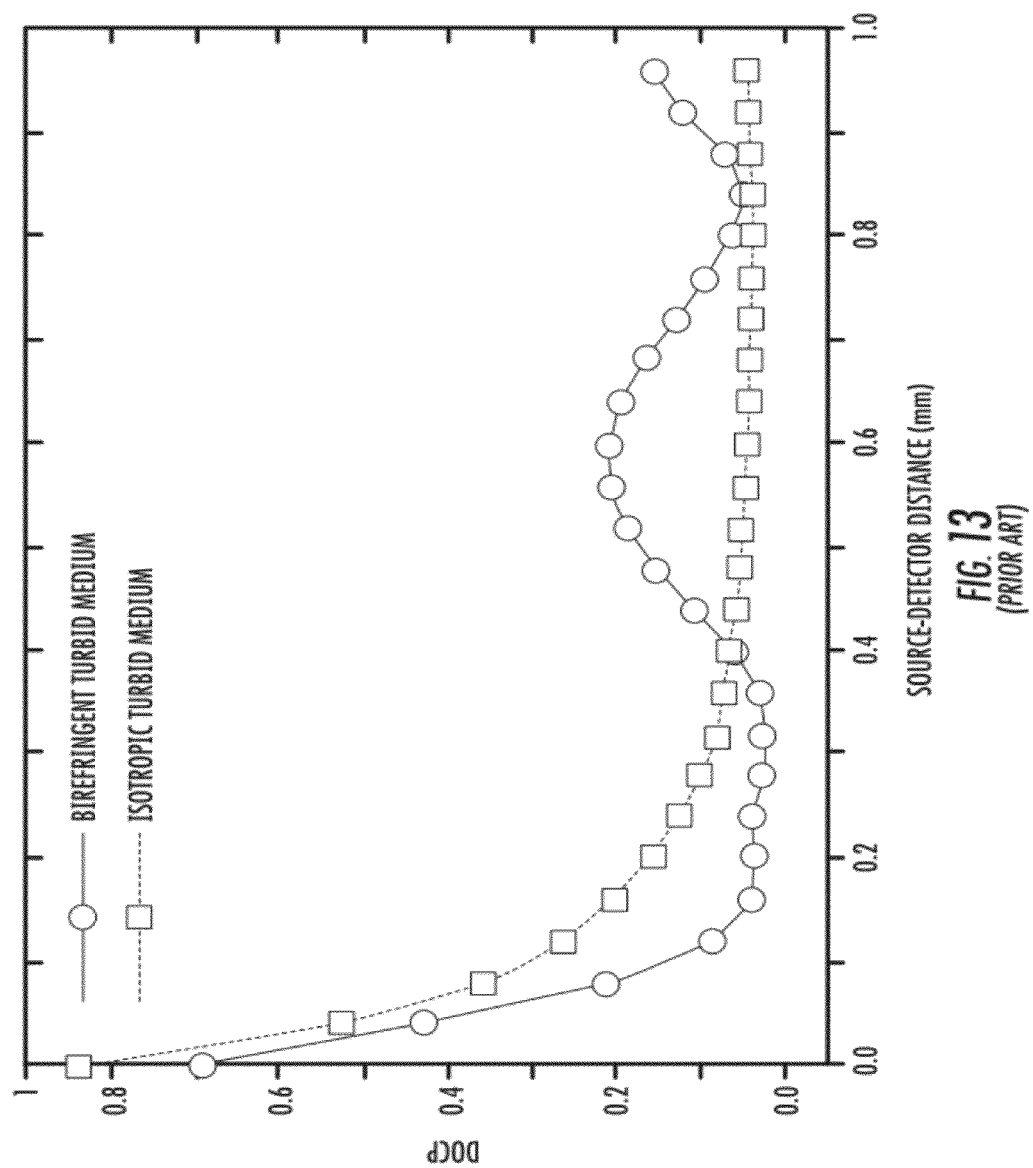
FIG. 13 is a graph of the degree of linear polarization patterns of backscattered light as a function of distance and medium as in the prior art.

The user's finger 22 may comprise a layer of skin. The skin may be considered a turbid medium of live tissue and comprises a stratum corneum 35, an epidermis 36, a dermis 37, and a hypodermis/subcutis 38. Each layer of the skin may scatter the projected light 26 from the optical source 24 in different patterns and with differing depolarization angles. See, "The appearance of Human Skin," Takanori Igarashi at. al., Technical Report CUCS-024-05, CS department, Columbia University, June 2005, pp. 1-88, the entire contents of which are incorporated by reference. Furthermore, as illustrated in FIGS. 4-9, each layer of the skin may exhibit unique spectral absorption and scattering properties for the projected light 26. See, "Imaging skin pathology with polarized light," Steven Jacques at. al., Oregon Health and Science University, the entire contents of which are incorporated by reference, and "The appearance of Human Skin," Takanori Igarashi at. al., Technical Report CUCS-024-05, CS department, Columbia University, June 2005. As illustrated in FIG. 10, the turbid medium may also comprise a birefringent turbid medium, depicted as white regions with different dominant scattering patterns or an isotropic turbid medium. See, "Polarization Effects in Optical Coherence Tomography of Various Biological Tissues," Johannes F. de Boer et al., IEEE J. Sel. Top. Quantum Electron. 5, 1200-1204, (1999), the entire contents of which are incorporated by reference.

Figure 14:
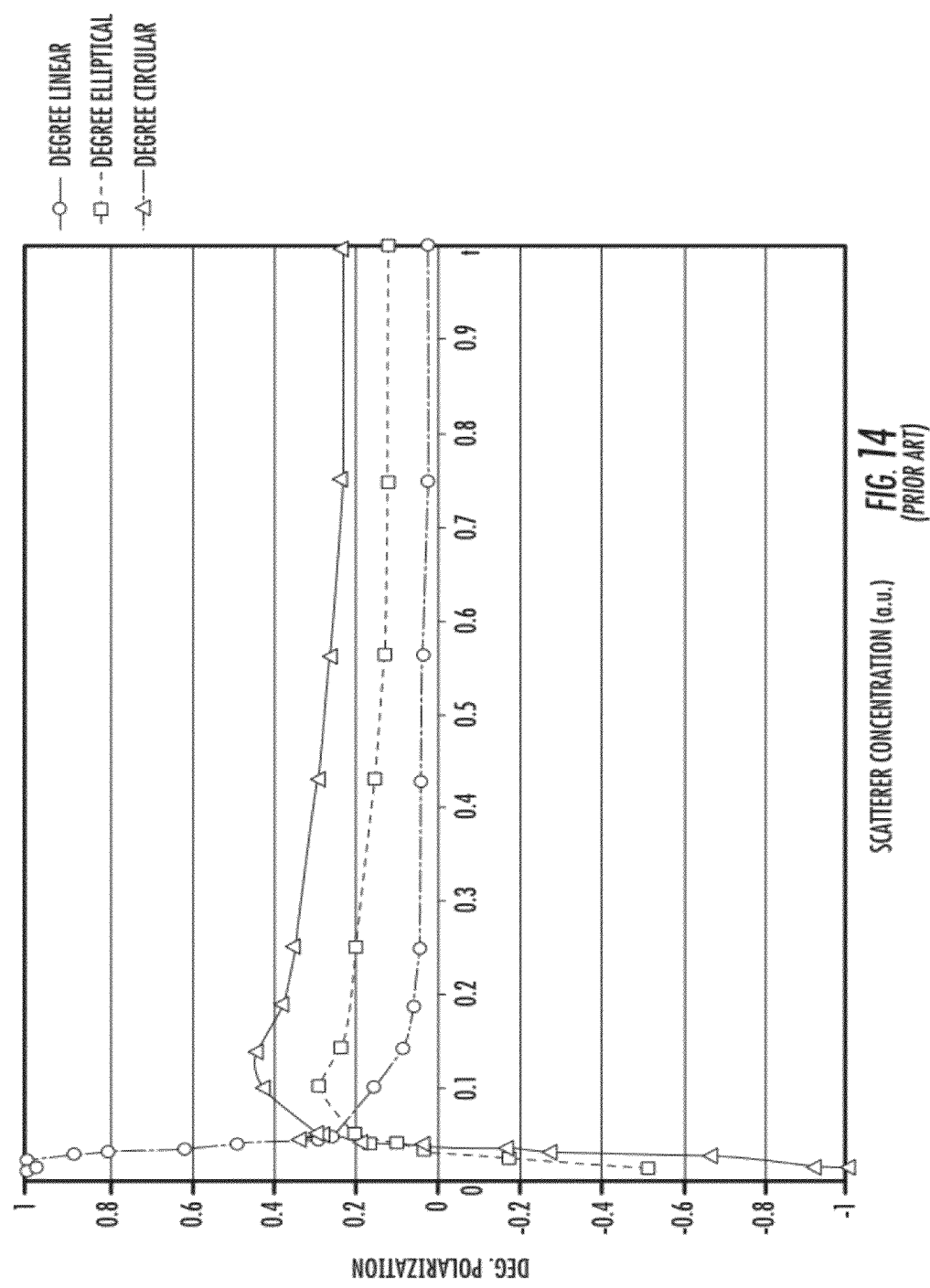
FIG. 14 is a graph of polarization degree of backscattered light for linear, circular, and elliptical polarized incident light as a function of scatterer concentration as in the prior art.

Moreover, polarized light may propagate differently within turbid mediums. As illustrated in FIGS. 11a-c and 13, with linearly polarized incident light, the degree of linear polarization patterns of backscattered light may vary based upon the type of turbid medium. See, "Propagation of polarized light in birefringent turbid media: time-resolved simulations," X. Wang and L. Wang, Optics Express Vol. 9, No. 5, pp. 254-259 (2001), the entire contents of which are incorporated by reference. As illustrated in FIGS. 12a-c and 13, the incident light may also be circularly polarized and may have different degree of linear polarization patterns for backscattered light. Furthermore, as illustrated in FIG. 14, the linear polarization patterns of backscattered light for linear, circular, and elliptical polarized incident light may vary based on the scatterer concentration. See, "Polarization properties of light backscattered from a two layer scattering medium,", S. P. Morgan et al., Optics Express, 2000, Vol. 7, No. 12, pp. 395-402, the entire contents of which are incorporated by reference.

A method aspect of the present invention is directed to a multi-biometric finger sensor method. The method may include receiving a user's finger adjacent an integrated circuit substrate, projecting light onto the user's finger, sensing a depolarization angle of reflected light from the user's finger by using at least one optical sensing pixel on the integrated circuit substrate, sensing another biometric of the user's finger by using at least one other biometric sensing pixel on the integrated circuit substrate, and spatially correlating the biometric characteristics of the user' finger at varying depths.

The method may further include polarizing the light before being projected onto the user's finger. Alternatively or additionally, the method may include polarizing the light reflected from the user's finger before sensing of the depolarization angle.

Of course the polarization finger sensing approach can be used by itself, as well as being advantageously used in combination with another biometric characteristic as described herein. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included.

That which is claimed is:

1. A multi-biometric finger sensor comprising:
   an integrated circuit (IC) substrate for receiving a user's finger;
   an optical source for projecting light of a known polarization angle onto the user's finger;
   at least one optical sensing pixel on said IC substrate for detecting a relative depolarization angle of the light reflected from the user's finger; and
   at least one other biometric finger sensing pixel on said IC substrate for sensing at least one other biometric characteristic from the user's finger.

2. The multi-biometric finger sensor as in claim 1 further comprising a processor coupled to said at least one optical sensing pixel and said at least one other biometric finger sensing pixel and cooperating therewith to reduce spoofing.

3. The multi-biometric finger sensor as in claim 1 wherein said optical source is on said IC substrate.

4. The multi-biometric finger sensor as in claim 1 further comprising at least one polarization filter in an optical path between said optical source and said at least one optical sensing pixel.

5. The multi-biometric finger sensor as in claim 4 wherein said at least one polarization filter comprises a respective polarizing filter associated with each of said optical source and said at least one optical detector.

6. The multi-biometric finger sensor as in claim 4 wherein said at least one polarization filter comprises a material having at least one dichroic polarization property.

7. The multi-biometric finger sensor as in claim 1 further comprising a dielectric passivation layer over said at least one optical sensing pixel and said at least one other biometric finger sensing pixel.

8. The multi-biometric finger sensor as in claim 1 wherein said IC substrate comprises silicon.

9. The multi-biometric finger sensor as in claim 1 wherein said optical source comprises an LED.

10. The multi-biometric finger sensor as in claim 1 wherein said optical source comprises a laser diode.

11. The multi-biometric finger sensor as in claim 1 wherein said optical source produces at least one circularly polarized light, elliptically polarized light, and linearly polarized light.

12. The multi-biometric finger sensor as in claim 1 wherein said at least one other biometric finger sensing pixel comprises an electric field sensing pixel.

13. The multi-biometric finger sensor as in claim 1 wherein said at least one other biometric finger sensing pixel comprises a capacitive sensing pixel.

14. The multi-biometric finger sensor as in claim 1 wherein said at least one other biometric finger sensing pixel comprises a thermal sensing pixel.

15. The multi-biometric finger sensor as in claim 1 wherein said optical sensing pixel and said at least one other biometric sensing pixel are operable based upon at least one of static placement of the user's finger and sliding placement of the user's finger adjacent to said IC substrate.

16. A multi-biometric finger sensor comprising:
- an integrated circuit (IC) substrate for receiving a user's finger;
- an optical source on said IC substrate for projecting light of a known polarization angle onto the user's finger;
- at least one optical sensing pixel on said IC substrate for detecting a relative depolarization angle of the light reflected from the user's finger;
- at least one polarization filter in an optical path between said optical source and said at least one optical sensing pixel;
- at least one other biometric finger sensing pixel on said IC substrate for sensing at least one other biometric characteristic from the user's finger; and
- a processor coupled to said at least one optical sensing pixel and said at least one other biometric finger sensing pixel and cooperating therewith to reduce spoofing.

17. The multi-biometric finger sensor as in claim 16 wherein said at least one polarization filter comprises a respective polarizing filter associated with each of said optical source and said at least one optical sensing pixel.

18. The multi-biometric finger sensor as in claim 16 wherein said at least one polarization filter comprises a material having at least one dichroic polarization property.

19. The multi-biometric finger sensor as in claim 16 wherein said optical source comprises at least one of an LED and a laser diode.

20. The multi-biometric finger sensor as in claim 16 wherein said optical source produces at least one of circularly polarized light, elliptically polarized light, and linearly polarized light.

21. The multi-biometric finger sensor as in claim 16 wherein said at least one other biometric finger sensing pixel comprises at least one of an electric field sensing pixel, a capacitive sensing pixel, and a thermal sensing pixel.

22. A method for multi-biometric finger sensing comprising:
- receiving the user's finger adjacent an integrated circuit (IC) substrate;
- projecting light on the user's finger from an optical source;
- sensing a depolarization angle of reflected light from the user's finger by using at least one optical sensing pixel on the IC substrate; and
- sensing another biometric characteristic of the user's finger by using at least one other biometric sensing pixel on the IC substrate.

23. The method as in claim 22 further comprising coupling a processor to the at least one optical sensing pixel and the at least one other biometric sensing pixel and cooperating therewith to reduce spoofing.

24. The method as in claim 22 further comprising positioning at least one polarization filter in an optical path between the optical source and the at least one optical sensing pixel.

25. The method as in claim 24 wherein the at least one polarization filter comprises a respective polarizing filter associated with each of the optical source and the at least one optical detector.

26. The method as in claim 24 wherein the at least one polarization filter comprises a material having at least one dichroic polarization property.

27. The method as in claim 22 wherein the optical source comprises at least one of an LED and a laser diode.

28. The method as in claim 22 wherein the optical source produces at least one of circularly polarized light, elliptically polarized light, and linearly polarized light.

29. The method as in claim 22 wherein the at least one other biometric finger sensing pixel comprises at least one of an electric field sensing pixel, a capacitive sensing pixel, and a thermal sensing pixel.

* * * * *